(12) United States Patent
Lu et al.

(10) Patent No.: US 10,933,761 B1
(45) Date of Patent: Mar. 2, 2021

(54) VEHICLE GENERATOR-INVERTER FOR SPLIT-PHASE UNBALANCED LOADS

(71) Applicant: FORD GLOBAL TECHNOLOGIES, LLC, Dearborn, MI (US)

(72) Inventors: Xi Lu, Northville, MI (US); Ke Zou, Canton, MI (US); Krishna Prasad Bhat, Canton, MI (US); Chingchi Chen, Ann Arbor, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/589,744

(22) Filed: Oct. 1, 2019

(51) Int. Cl.
| | |
|---|---|
| *B60L 53/22* | (2019.01) |
| *H02M 7/5387* | (2007.01) |
| *H02M 7/219* | (2006.01) |
| *H02M 1/00* | (2006.01) |
| *B60L 50/60* | (2019.01) |

(52) U.S. Cl.
CPC ............... *B60L 53/22* (2019.02); *B60L 50/60* (2019.02); *H02M 1/00* (2013.01); *H02M 7/219* (2013.01); *H02M 7/5387* (2013.01); *B60L 2210/12* (2013.01); *B60L 2210/14* (2013.01); *B60L 2210/30* (2013.01); *B60L 2210/40* (2013.01); *H02M 2001/007* (2013.01)

(58) Field of Classification Search
CPC ...... B60L 53/22; B60L 50/60; B60L 2210/12; B60L 2210/14; B60L 2210/30; B60L 2210/40; H02M 1/00; H02M 7/219; H02M 7/5387; H02M 2001/007
See application file for complete search history.

(56) References Cited

U.S. PATENT DOCUMENTS 8,425,696 B2    4/2013   Oda et al.

*Primary Examiner* — Robert L Deberadinis
(74) *Attorney, Agent, or Firm* — David B. Kelley; Brooks Kushman P.C.

(57) ABSTRACT

A system and method for powering an electrical load. The system and method including a first inverter for converting a first DC power provided from a battery within a vehicle to a first AC power. The system and method also including a rectifier that includes an input connected to a secondary winding of a transformer. The rectifier also having an output connected to at least two capacitors. The rectifier and capacitors converting the first AC power to a second DC power. The system and method also including an inverter for converting the second DC power to an output AC power that is supplied to a split-phase output. The system and method also connecting one leg of the split-phase output between the at least two capacitors and to a center tap of the transformer to modify a voltage amplitude of the second DC power.

20 Claims, 4 Drawing Sheets

VEHICLE GENERATOR-INVERTER FOR SPLIT-PHASE UNBALANCED LOADS

TECHNICAL FIELD

This disclosure relates to a vehicle that may include a generator-inverter capable to provide a balanced voltage output to a split-phase load.

BACKGROUND

Electric and hybrid-electric vehicles include a high voltage battery (i.e., traction battery) that is generally used to supply energy to an electric machine for propelling the vehicle. The energy from the battery may also be used to power electronics within the vehicle. The energy from the battery could further be transformed to power loads external to a vehicle.

SUMMARY

A system and method is disclosed for a generator-inverter that is operable to power a split-phase electrical load. The generator-inverter may include a first inverter that converts a first DC power to a first AC power. The generator-inverter may also include a transformer having a primary winding and secondary winding. The primary winding may be connected to the first inverter to receive and transfer the first AC power from the primary winding to the secondary winding. The generator-inverter may also include a rectifier having an input connected to the secondary winding of the transformer to receive the first AC power. An output of the rectifier may be connected to at least two capacitors. The rectifier and capacitors may operate to convert the first AC power to a second DC power.

The generator-inverter may also include a second inverter that converts the second DC power to an output AC power. The generator-inverter may include a split-phase output connected to second inverter to receive the output AC power. The split-phase output may also include a first power leg and a second power leg connected to the second inverter. The split-phase output may further include a split-phase leg electrically connected between the at least two capacitors. The split-phase leg may also be connected to a center tap of the transformer. By connecting the split-phase leg to the center tap of the transformer, the rectifier and the at least two capacitors may operate to modify a voltage amplitude of the second DC power.

It is contemplated that the rectifier and the at least two capacitors may operate in a buck mode to decrease the voltage amplitude of the second DC power or in a boost mode to increase the voltage amplitude of the second DC power.

It is also contemplated that the rectifier may designed using a full bridge circuit configuration that includes at least four switching elements that operate between an active state and an inactive state. A controller may control the at least four switching elements between an active state and an inactive state. The controller may modify an operating frequency of the at least four switching elements between the active state and the inactive state when half a first voltage level indicative of the second DC power minus a second voltage level indicative of a second voltage level between the at least two capacitors is not approximately equal to zero. The controller may also apply a pulse width modulation signal to control an operating frequency and a duty cycle of the at least four switching elements between the active state and the inactive state. Lastly, the controller may modify the operating frequency of the at least four switching elements using a feedback control algorithm.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
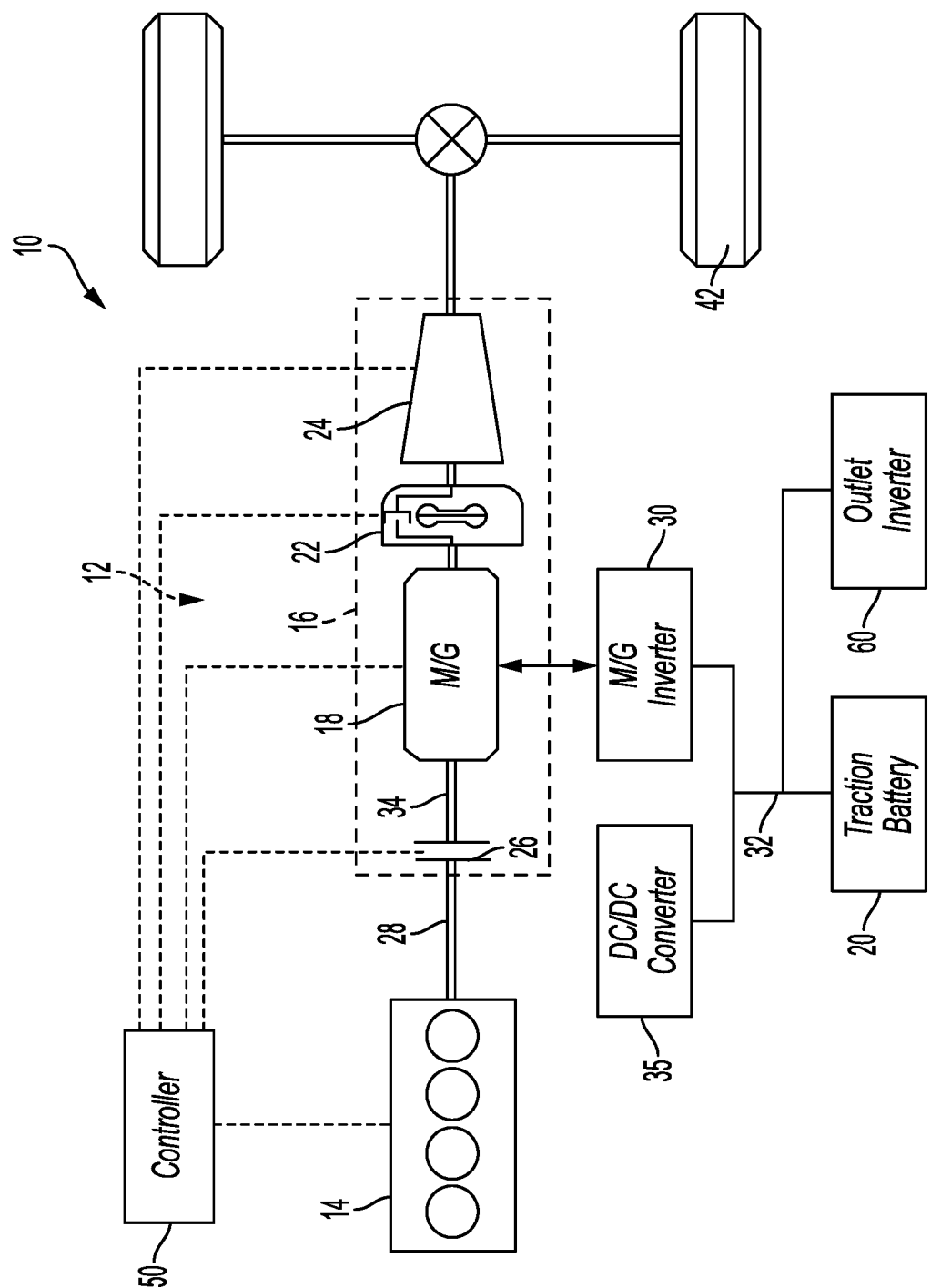
FIG. 1 illustrates an exemplary topology of an electric vehicle.

Referring to FIG. 1, a schematic diagram of a hybrid-electric vehicle 10 is illustrated according to an embodiment of the present disclosure. The vehicle 10 includes an auxiliary power system that allows the vehicle 10 to be used as a mobile generator or inverter. FIG. 1 illustrates representative relationships among the components. Physical placement and orientation of the components within the vehicle may vary. The vehicle 10 includes a powertrain 12. The powertrain 12 may include an engine 14 that drives a transmission 16, which may be referred to as a modular hybrid transmission (MHT). As will be described in further detail below, the transmission 16 may include an electric machine such as an electric motor/generator (M/G) 18, an associated battery 20 (i.e., traction battery or high-voltage battery), a torque converter 22, and a multiple step-ratio automatic transmission or gearbox 24. For simplicity, the M/G 18 may be referred to as a motor. The engine 14, M/G 18, torque converter 22, and the gearbox 24 may be connected sequentially in series, as illustrated in FIG. 1.

The engine 14 and the M/G 18 are both drive sources for the vehicle 10 and may be referred to as actuators. The engine 14 generally represents a power source that may include an internal-combustion engine such as a gasoline, diesel, or natural gas engine. The engine 14 generates engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor.

The M/G 18 is powered by a traction battery 20 (i.e., high voltage battery). The traction battery 20 stores energy in a plurality of individual battery cells connected together to provide a desired voltage and charge capacity. In one embodiment, traction battery 20 includes an array of lithium-ion battery cells. The traction battery 20 typically provides a high-voltage direct current (DC) output to a bus 32, although the voltage and current may vary depending on particular operating conditions and loads. The traction battery 20 is electrically connected to an inverter 30, and a DC/DC converter 35, for example. The inverter 30 converts DC power from the battery to AC power for use with the electric machines. For example, power electronics may provide three-phase alternating current (AC) to the M/G 18. The inverter 30 is also capable of acting as a rectifier. The DC/DC converter 35 is configured to convert the high-voltage DC output of the traction battery 20 to a low-voltage DC supply that is compatible with other vehicle loads that may be directly connected thereto. The inverter 30 may include an inductor configured to step-up or step down current and voltage.

One or more contactors may isolate the traction battery 20 from other components when open and connect the traction battery 20 to the other components when closed. The traction battery 20 may include various internal circuits for measuring and monitoring various operating parameters including cell current and individual cell voltage. Parameters such as voltage, current and resistance for a battery cell or a group of battery cells (sometimes referred to an array) may be monitored and/or controlled by a controller 50.

Vehicle 10 may also include an auxiliary battery having a relatively lower nominal voltage (such as 24V or 48V, for example) and may be implemented using different battery chemistries than the traction battery 20. The auxiliary battery may also be referred to as a low-voltage battery, starter battery or simply the vehicle battery for various applications. The auxiliary battery may be used to power various low-voltage components, controllers, modules, motors, actuators, sensors, etc.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 34 into electrical energy to be stored in the battery 20 or used by vehicle systems such as an auxiliary electrical system. The disconnect clutch 26 can also be disengaged to isolate the engine 14 from the remainder of the powertrain 12 such that the M/G 18 can act as the sole drive source for the vehicle 10. The M/G 18 is continuously, drivably connected to the shaft 34, whereas the engine 14 is drivably connected to the shaft 34 only when the disconnect clutch 26 is at least partially engaged. When the disconnect clutch 26 is locked (fully engaged), the crankshaft 28 is fixed to the shaft 34.

The vehicle 10 includes an outlet power generator-inverter 60 connected to the bus 32. The generator-inverter 60 is configured to convert the DC power of the bus 32 to AC power that is compatible with the auxiliary power system. The generator-inverter 60 may also be configured to step-down the voltage of the bus 32 to voltages compatible with the auxiliary power system such as common wall voltages 120 and/or 240.

It should be understood that the schematic illustrated in FIG. 1 is merely exemplary and is not intended to be limiting. Other series-hybrid configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Further, the vehicle 10, in other embodiments, may include a parallel-hybrid configured (also known as a split hybrid).

The vehicle 10 may also include a controller 50 such as a powertrain control unit (PCU), an engine control module (ECM), a motor control unit (MCU), and a DC/AC inverter controller (DCACA). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 50 within each of the subsystems identified above.

Figure 2:
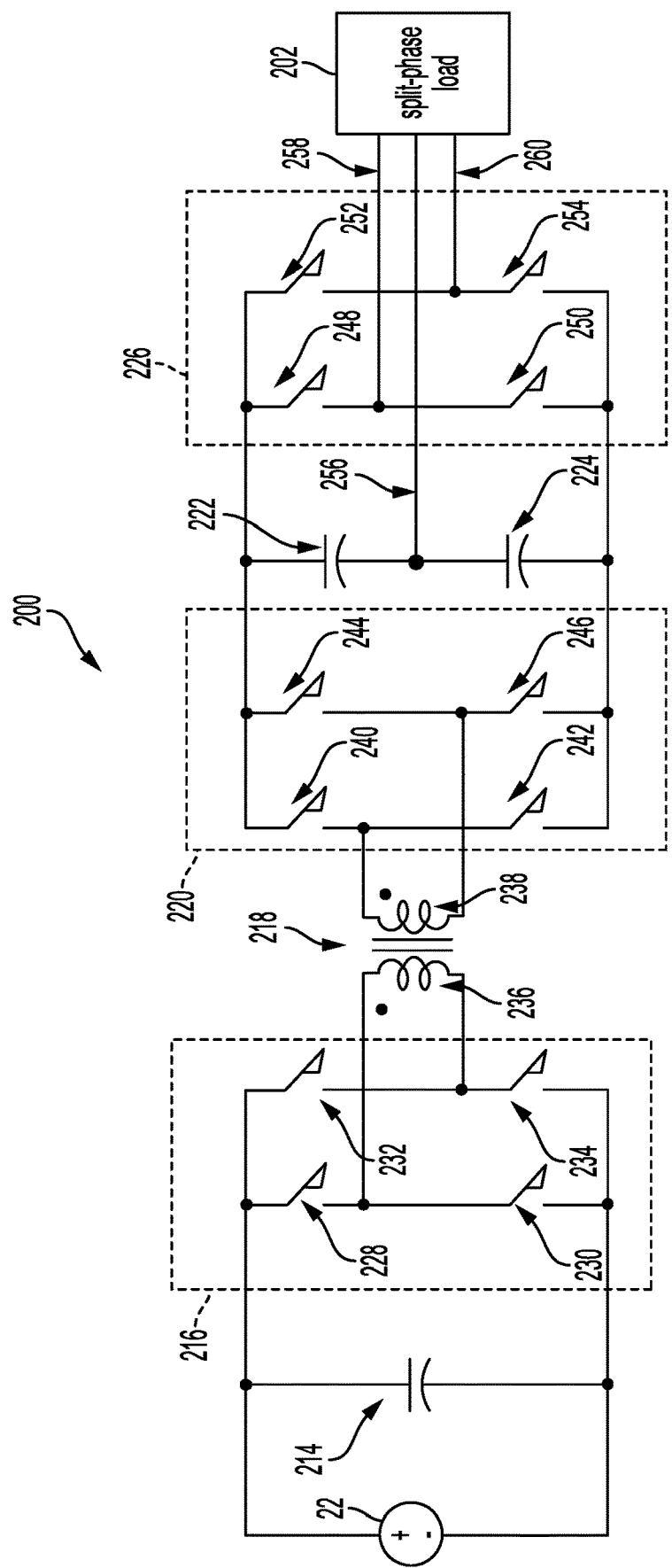
FIG. 2 illustrates an exemplary topology of a generator-inverter circuit.

FIG. 2 illustrates a circuit 200 where the battery 20 within the vehicle 10 may be used to power one or more electrical loads 202 (e.g., split-phase loads) having various AC-voltage levels (e.g., 120-volts or 240-volts) that may operate at different frequency levels (e.g., 50 Hz or 60 Hz). Circuit 200 may include a capacitor 214, an inverter 216, a transformer 218, and a rectifier 220 (i.e., full bridge rectifier). It is contemplated that inverter 216 may include a set of switches 228-234 and rectifier 220 may include another set of switches 240-246 which may be electronically opened or closed by the controller 50. It is contemplated that switches 228-234 and switches 240-246 may be designed using electronically controlled diodes, transistors (e.g., insulated gate bipolar transistor), or the like.

It is contemplated that when DC-voltage is supplied by battery 20, the capacitor 214 may operate to smooth the provided DC-voltage being supplied to the inverter 216. The inverter 216 may then be controlled to convert the DC-voltage to an AC-voltage operating at a given frequency. (e.g., 50 kHz). It is contemplated that the switches 228-234 may be turned on and off in a sequential manner. For instance, inverter 216 may operate to activate switch 228 and switch 234 while switch 230 and switch 233 remain deactivated. Inverter 216 may then activate switch 230 and switch 233 while switch 228 and switch 234 remain deactivated. By this action, inverter 216 may generate to generate the AC-voltage at the frequency desired. The AC-voltage and frequency level may be electronically adjusted by controller 50 that operates to control switches 228-234.

The AC-voltage generated by inverter 216 may then be supplied to the primary winding 236 of transformer 218. It is contemplated that the transformer 218 may be a high frequency insulating transformer operable to handle the high frequency AC-voltage supplied by inverter 216. The AC-voltage and frequency level supplied to transformer 218 may also be different than the AC-voltage and frequency level required by electrical load 202. For instance, inverter 216 may be designed to invert the DC-voltage supplied by the battery 20 to a given AC voltage and frequency level that allows for efficient operation by transformer 218. Or inverter 216 may be designed to invert the DC-voltage supplied by the battery 20 to a given AC voltage and frequency level that allows for transformer 218 to be smaller in size thereby improving the overall packaging sizing of circuit 200.

The transformer 218 may then transmit and/or convert the AC-voltage to the secondary winding 238. For instance, the transformer 218 may be designed to step up or down the voltage being supplied to the secondary winding 238. The rectifier 220 may operate to convert the AC-voltage supplied from the secondary winding 238 of the transformer to a DC-voltage. The first split-phase capacitor 222 and the second split-phase capacitor 224 may then be used to smooth and balance the DC-voltage outputted from the rectifier 220.

A second inverter 226 may operate to change the DC-voltage provided by rectifier 220 to a desired AC-voltage and frequency level necessary to power the electrical loads 202. As illustrated, the circuit 200 may designed to provide a split-phase power to one or more electrical loads 202. As shown, the split-phase power system is designed such that a split leg 256 may be connected between the first split-phase capacitor 222 and the second split-phase capacitor 224. A first leg 258 may be connected between switch 248 and switch 250 and a second leg 260 may be connected between switch 252 and switch 254.

It is contemplated that a first AC-voltage level may be provided between the first leg 258 and the split leg 256 while a second AC-voltage level may be provided between the second leg 260 and the split leg 256. For instance, a first power of 120-volt AC (at 60 Hz) may be provided between the first leg 258 and the split leg 256 and a second power of 120-volt AC (at 60 Hz) may be provided between the second leg 260 and the split leg 256. It is contemplated that the split-phase voltage outputs could be provided to more than one electrical load 202. For instance, circuit 200 could be designed to provide dual 120-Volt (60 Hz) outputs to multiple electrical loads 202. Or, circuit 200 could be designed to provide a single 240-Volt (60 Hz) output to a single electrical load 202.

While circuit 200 provides a split-phase voltage output, it is contemplated that the difference in voltages between the first split-phase capacitor 222 and the second split-phase capacitor 224 may lead to an unbalanced load or unsymmetrical output voltage waveform at the electrical load 202. For instance, it is contemplated that the output voltage may have a positive half with a continuous DC voltage bias. This may result in the first split-phase capacitor 222 trying to accommodate the DC voltage bias by discharging more frequently than the second split-phase capacitor 224. During such instances, the circuit will experience an unbalanced split capacitor condition. The output voltage generated based on may then be unsymmetrical, where the positive half of the AC-voltage output may have smaller amplitude than the negative half of the AC-voltage output.

Figure 3:
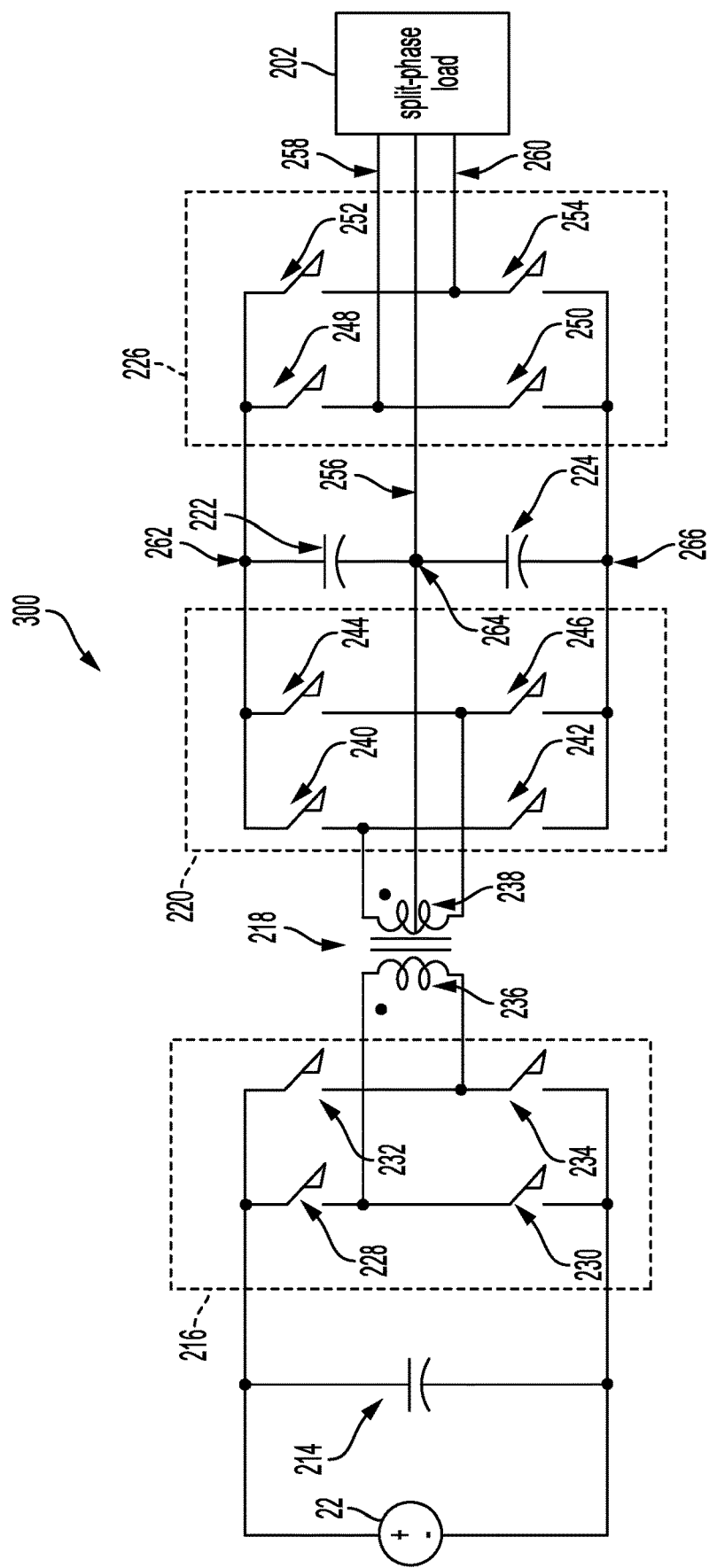
FIG. 3 illustrates an alternative topology of a generator-inverter circuit.

FIG. 3 illustrates an alternative embodiment where circuit 300 may operate to correct potential unsymmetrical output voltages being provided to the electrical load 202. As illustrated, the split leg 256 may be extended to further connect between the center-tab of the secondary winding 238 of the transformer 218. By providing a center-tap at the secondary winding 238, circuit 200 may further be capable of providing dual buck-boost switching mode power operability. The center-tap connection of the split leg 256 will allow the rectifier 220 to be electronically controlled to produce a regulated output DC voltage. For instance, the rectifier 220 can be controlled to produce a higher output DC-voltage to correct an unbalanced split capacitor condition. Alternatively, the rectifier 220 can be electronically controlled to produce a lower output DC-voltage to correct the unbalanced split capacitor condition. By providing a balanced split capacitor DC-voltage, the corresponding split-phase AC-voltage provided to the electrical load 202 may be correspondingly balanced.

It is contemplated that the extended the split leg 256 may operate as part of the rectifier 220 in order to convert the AC-voltage to DC-voltage. Circuit 300 may allow the rectifier 220 to operate at a 50% duty cycle with a certain phase shift from the first leg 258 and second leg 260. The phase shift from the first leg 258 and second leg 260 may enable the power transfer. By operating at 50% duty cycle, the split leg 256 forms a buck-boost converter which can balance the split capacitor.

Figure 4:
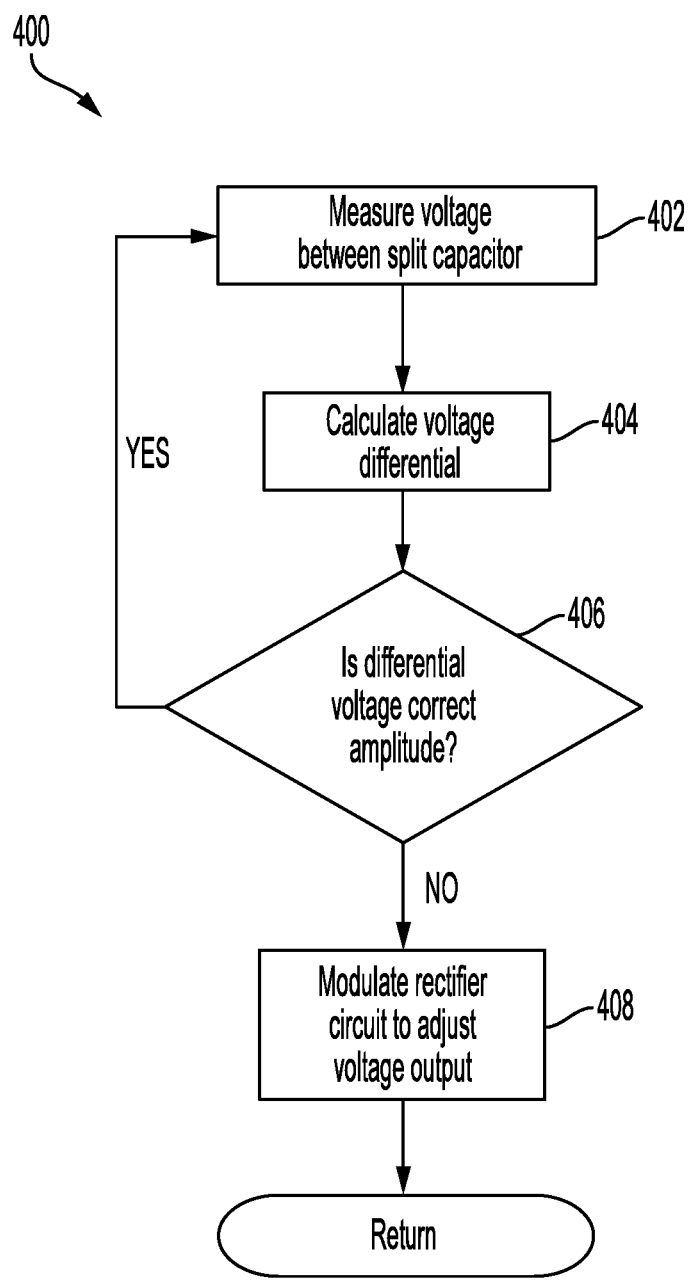
FIG. 4 illustrates a flow diagram for controlling the generator-inverter circuit.

FIG. 4 illustrates a flow diagram 400 for how the controller 50 may control the circuit 300 to adjust the DC-voltage to correct for an unbalanced condition. At step 402 the controller 50 may measure the voltage between the first split-phase capacitor 222 and the second split-phase capacitor 224. For instance, controller may measure a first voltage at point 262 (i.e., Vdc) and a reference voltage at point 264 (i.e., V1). It is contemplated that controller may alternatively measure the first voltage at point 266 (i.e., Vdc) and the reference voltage at point 264 (i.e., V1).

At step 402, the controller 50 may calculate the split capacitor DC-voltage using Equation 1 below:

$$Vdc/2 - V1 \quad \text{(Equation 1)}$$

At step 404, the controller 50 may determine whether the split capacitor DC-voltage is balanced. It is contemplated that Equation 1 should be zero if the split capacitor DC-voltage is balanced. For instance, if the first voltage is measured at point 262 as being 50-Volts and the reference voltage is measured at point 264 as being 25-Volts the controller would determine the split capacitor DC-voltage is balanced (i.e., 50/2−25=0 Volts). Controller 50 would therefore determine the split capacitor DC-voltage is balanced and flow diagram would return to step 402.

If for instance, the first voltage is measured at point 262 as being 50-Volts and the reference voltage is measured at point 264 as being 20-Volts the controller 50 would determine the split capacitor DC-voltage is not be balanced (i.e., 50/2−20=5 Volts). Instead, the controller 50 would determine the voltage being provided from the rectifier 220 is higher than the desired value. Flow diagram would proceed to step 408 where the controller 50 would begin modulating the rectifier 220 to adjust the output DC-voltage. Flow diagram 400 would then return to step 402 to determine if the modulation of the rectifier 220 has reduced the split capacitor DC-voltage to a balanced level or if further modulation may be required.

It is contemplated that controller 50 may employ a closed-loop feedback control to determine the amount of modulation required. For instance, controller 50 may employ a proportional-integral (PI) or proportional-integral-derivative (PID) feedback control based on a reference signal to determine the amount of modulation that should be applied to the rectifier 220. It is also contemplated that the modulation may be a pulse width modulation signal that opens and closes switches 240-246 at a given frequency rate and duty cycle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system that powers an electrical load, comprising:
   a first inverter that converts a first DC power to a first AC power;
   a transformer having a primary winding and secondary winding, wherein the primary winding is connected to the first inverter to receive and transfer the first AC power from the primary winding to the secondary winding;
   a rectifier having an input connected to the secondary winding to receive the first AC power, the rectifier having an output connected to at least two capacitors, wherein the rectifier and at least two capacitors are operable to convert the first AC power to a second DC power;
   a second inverter that converts the second DC power to an output AC power; and
   a split-phase output operable to receive the output AC power, the split-phase output including a first power leg and a second power leg connected to the second inverter, the split-phase output also including a split-phase leg electrically connected between the at least two capacitors, the split-phase leg also being electrically connected to a center tap of the transformer, wherein the rectifier and the at least two capacitors operate to modify a voltage amplitude of the second DC power.

2. The system of claim 1, wherein the rectifier and the at least two capacitors operate in a buck mode to decrease the voltage amplitude of the second DC power.

3. The system of claim 1, wherein the rectifier and the at least two capacitors operate in a boost mode to increase the voltage amplitude of the second DC power.

4. The system of claim 1, wherein the rectifier includes full bridge circuitry that includes at least four switching elements that operate between an active state and an inactive state.

5. The system of claim 4 further comprising a controller operable to control the at least four switching elements.

6. The system of claim 5, wherein the controller is operable to receive a first signal indicating a first voltage level for the second DC power and a second signal indicating a second voltage level located between the at least two capacitors, wherein the controller is further operable to modify an operating frequency and a duty cycle of the at least four switching elements between the active state and the inactive state, wherein the controller is further operable to use a closed-loop feedback control to modify the operating frequency and the duty cycle such that half the first voltage level minus the second voltage level is driven to a value approximately equal to zero.

7. The system of claim 6, wherein the controller is operable to apply a pulse width modulation signal to control the operating frequency and the duty cycle of the at least four switching elements between the active state and the inactive state.

8. The system of claim 6, wherein the controller modifies the operating frequency and the duty cycle of the at least four switching elements using a feedback control algorithm.

9. The system of claim 1, wherein the transformer is a high frequency insulating transformer operable to transform a high frequency AC power received from the first inverter.

10. The system of claim 1, wherein the first DC power is provided by a battery located within a vehicle.

11. A method for powering an electrical load, comprising:
    converting a first DC power provided from a battery to a first AC power;
    converting the first AC power to a second DC power using a rectifier and at least two capacitors connected to an output of the rectifier, wherein the first AC power is provided by a transformer having a primary winding and a secondary winding, and wherein the secondary winding is connected to an input of the rectifier;
    converting the second DC power to an output AC power that is supplied to a split-phase output; and
    modifying a voltage amplitude of the second DC power by electrically connecting at least one leg of the split-phase output between the at least two capacitors and to a center tap of the transformer.

12. The method of claim 11 further comprising: decreasing the voltage amplitude of the second DC power by operating the rectifier and the at least two capacitors in a buck mode.

13. The method of claim 11 further comprising: increasing the voltage amplitude of the second DC power by operating the rectifier and the at least two capacitors in a boost mode.

14. The method of claim 11 further comprising: operating the rectifier between an active state and an inactive state using a full bridge circuit configuration that includes at least four switching elements.

15. The method of claim 14 further comprising:
    receiving a first signal indicating a first voltage level for the second DC power and a second signal indicating a second voltage level located between the at least two capacitors; and
    modifying an operating frequency and a duty cycle of the at least four switching elements between the active state and the inactive state such that half the first voltage level minus the second voltage level is driven to a value approximately equal to zero.

16. The method of claim 15 further comprising: applying a pulse width modulation signal to control the operating frequency and the duty cycle of the at least four switching elements between the active state and the inactive state.

17. The method of claim 16 further comprising: modifying the operating frequency and the duty cycle of the at least four switching elements using a feedback control algorithm.

18. A system that powers an electrical load, comprising:
    a first inverter that converts a first DC power received from a battery within a vehicle to a first AC power;
    a transformer having a primary winding and secondary winding, wherein the primary winding is connected to the first inverter to receive and transfer the first AC power from the primary winding to the secondary winding;
    a rectifier having an input connected to the secondary winding to receive the first AC power, the rectifier having an output connected to at least two capacitors, wherein the rectifier and at least two capacitors are operable to convert the first AC power to a second DC power;

a second inverter that converts the second DC power to an output AC power;

a split-phase output operable to receive the output AC power, the split-phase output including a first power leg and a second power leg connected to the second inverter, the split-phase output also including a split-phase leg electrically connected between the at least two capacitors, the split-phase leg also being electrically connected to a center tap of the transformer; and a controller operable to receive a first signal indicating a first voltage level for the second DC power and a second signal indicating a second voltage level located between the at least two capacitors, wherein the controller is further operable to use a closed-loop feedback control to modify an operating frequency and a duty cycle of the at least four switching elements between an active state and an inactive state such that half the first voltage level minus the second voltage level is driven to a value approximately equal to zero.

19. The system of claim 18, wherein the rectifier and the at least two capacitors operate in a buck mode to decrease a voltage amplitude of the second DC power.

20. The system of claim 18, wherein the rectifier and the at least two capacitors operate in a boost mode to increase a voltage amplitude of the second DC power.

\* \* \* \* \*